United States Patent
Tamaoki

(10) Patent No.: US 8,565,277 B2
(45) Date of Patent: Oct. 22, 2013

(54) PULSE MODULATION METHOD AND OPTICAL FIBER LASER

(75) Inventor: Shinobu Tamaoki, Yokohama (JP)

(73) Assignee: Sumitomo Electric Industries, Ltd., Osaka-shi (JP)

( * ) Notice: Subject to any disclaimer, the term of this patent is extended or adjusted under 35 U.S.C. 154(b) by 118 days.

(21) Appl. No.: 12/692,226

(22) Filed: Jan. 22, 2010

(65) Prior Publication Data

US 2010/0189139 A1  Jul. 29, 2010

Related U.S. Application Data

(60) Provisional application No. 61/146,846, filed on Jan. 23, 2009.

(30) Foreign Application Priority Data

Jan. 23, 2009  (JP) ................. P2009-013283

(51) Int. Cl.
   *H01S 5/042*  (2006.01)
   *H01S 3/067*  (2006.01)

(52) U.S. Cl.
   USPC ............. 372/38.06; 372/6; 372/38.07

(58) Field of Classification Search
   USPC ............. 372/6, 38.06, 38.07
   See application file for complete search history.

(56) References Cited

U.S. PATENT DOCUMENTS

| 4,774,710 A * | 9/1988 | Davis et al. .......... 372/9 |
| 6,151,338 A * | 11/2000 | Grubb et al. ........ 372/6 |
| 7,436,863 B2 * | 10/2008 | Matsuda et al. ..... 372/6 |
| 2008/0198884 A1 * | 8/2008 | Kimura ............ 372/38.07 |

FOREIGN PATENT DOCUMENTS

| JP | 9-214041 A | 8/1997 |
| JP | 2007-42981 | 2/2007 |
| WO | WO-2007/099847 A1 | 9/2007 |

OTHER PUBLICATIONS

Office Action issued in counterpart Japanese Application No. 2009-013283 dated Mar. 26, 2013.

* cited by examiner

*Primary Examiner* — Jessica Stultz
*Assistant Examiner* — Michael Carter
(74) *Attorney, Agent, or Firm* — Venable LLP; Michael A. Sartori; Tamatane J. Aga

(57) ABSTRACT

The present invention relates to a pulse modulation method and the like having a structure for effectively suppressing nonlinear optical phenomena which increase as an optical pulse becomes wider when amplifying the optical pulse with a predetermined period as seed light. A modulator performs pulse modulation for a laser light source which is a seed light source or light outputted from the laser light source. A modulation pattern of a modulated voltage outputted from the modulator is adjusted such as to include a plurality of pulse components each having a signal width shorter than the pulse width of the optical pulse as an optical pulse generation pattern within a modulation period corresponding to a period of the optical pulse.

7 Claims, 18 Drawing Sheets

PULSE MODULATION METHOD AND OPTICAL FIBER LASER

CROSS-REFERENCE TO RELATED APPLICATION

This application claims priority to Provisional Application No. 61/146,846 filed on Jan. 23, 2009 by the same Applicant, which is hereby incorporated by reference in its entirety.

BACKGROUND OF THE INVENTION

1. Field of the Invention

The present invention relates to a pulse modulation scheme which repeatedly generates optical pulses of a predetermined period as seed light for obtaining high-power output light, and an optical fiber laser to which such a scheme is applied.

2. Related Background of the Invention

Attention has currently been paid to processing techniques using laser light, so that demands for high-power laser light sources have been increasing in the fields of processing, medical care, and the like. Among various laser light sources, those attracting attention in particular are optical fiber lasers. Such an optical fiber laser employs an amplification optical fiber, whose core is doped with a rare-earth element such as Yb (ytterbium), Er (erbium), or Tm (thulium), as an optical amplification medium. When pumping light is fed into this amplification optical fiber, seed light propagating therethrough is amplified. This allows the amplification optical fiber to emit laser light by outputting high-power amplified light or causing laser oscillation with a resonator structure. The optical fiber lasers are advantageous in that the laser light is confined within the optical fiber and thus is easy to handle, that their thermal dissipation is so good that no large-scale cooling equipment is necessary, and so forth.

As described above, the optical fiber lasers employ fibers doped with rare-earth elements. Among such rare-earth-element-doped fibers, Yb-doped fibers yield a high conversion efficiency and thus have widely been utilized as high-power outputting amplification optical fibers. Yb is pumped with pumping light as with the other rare-earth elements. On the other hand, the part of pumping light left unabsorbed within an amplification optical fiber is emitted from the other end of the amplification optical fiber.

When a resonator structure utilizing a fiber Bragg grating (FBG), a mirror reflector, or the like at each end is employed as a structure of an optical fiber laser, for example, pulse modulation is performed by arranging an optical switch or acousto-optic modulator (AOM) within the resonator. On the other hand, a MOPA (Master Oscillator Power Amplifier) type optical fiber laser such as one disclosed in Japanese Patent Application Laid-Open No. 2007-042981 directly or externally modulates a seed light source which outputs light to be amplified, so as to perform pulse modulation, and amplifies the resulting optical pulses, thereby yielding high-power output light. In either structure, the output obtained by pulsing the seed light is much higher than that in the case of a continuous-wave operation (CW operation), whereby nonlinear phenomena such as stimulated Raman scattering (SRS) and stimulated Brillouin scattering (SBS) may emerge.

SUMMARY OF THE INVENTION

The present inventors have examined the above conventional optical fibers which employ optical pulses as seed light, and as a result, have discovered the following problems.

In a laser scheme which pulses output light by directly modulating a seed light source such as an LD (Laser Diode) which outputs seed light, increasing the signal width (the width of a driving signal pulse for optical pulse generation, which is the time width of a modulated voltage defining the driving time of the LD) of a modulated voltage applied to the seed light source in order to enhance the pulse energy raises the probability of SBS occurring in the process of amplifying the power of seed light and thereby destroying optical components constructing the optical fiber laser and the pumping light source.

That is, when attention is focused on the half width of the output light spectrum from the LD acting as the seed light source, increasing the signal width of the modulated voltage for pulsing the seed light for obtaining a sufficient optical pulse energy narrows the half width of the spectrum. The SBS increases its gain as the spectrum width is narrower, thus leaving a problem that, when the modulated voltage applied to the seed light source has a longer pulse signal width, the SBS attains a greater gain or is more likely to occur.

The present invention has been developed to eliminate the problems described above. It is an object of the present invention to provide a pulse modulation method and optical fiber laser having a structure for effectively suppressing nonlinear optical phenomena such as SBS which increase as an optical pulse becomes wider when amplifying the optical pulse with a predetermined period as seed light.

The pulse modulation method accordance to the present invention modulates light outputted from a seed light source into an optical pulse with a predetermined period as a repetition period, by a modulator. The optical fiber laser according to the present invention is a laser light source which achieves such a pulse modulation method.

In particular, a modulation pattern, which is a pattern of a modulated voltage fed into the modulator, is set such as to be constituted by a plurality of pulse components corresponding to an optical pulse within a predetermined period, while each of the plurality of pulse components has a pulse width smaller than the pulse width of the overall optical pulse within the predetermined period.

Preferably, in the pulse modulation method according to the present invention, the plurality of pulse components are set such that each pulse width is smaller than ½ of the pulse width of the overall optical pulse within the predetermined period. In the plurality of pulse components, each pulse width may be longer than an interval between the pulse components adjacent to each other. Preferably, in the plurality of pulse components, the interval between the pulse components adjacent to each other is not longer than a rise time or fall time of the pulse component adjacent thereto. The plurality of pulse components may have pulse peak values different from each other.

The pulse modulation method according to the present invention may modulate a driving current of the seed light source, so as to adjust each peak value of the plurality of pulse components. In this case, the voltage modulation and current modulation are performed separately at the same modulation timing.

The optical fiber laser according to the present invention comprises a seed light source, a modulator, and an optical fiber amplifier. The modulator, which is used for modulating light to be amplified outputted from the seed light source into an optical pulse with a predetermined period as a repetition period, is electrically connected to the seed light source or disposed on an optical path of the light outputted from the seed light source. The optical fiber amplifier amplifies the light to be amplified modulated into the optical pulse and outputs thus amplified light.

In particular, a modulation pattern, which is a pattern of a modulated voltage fed into the modulator in the optical fiber laser according to the present invention, is set such as to be constituted by a plurality of pulse components corresponding to an optical pulse within a predetermined period, while each of the plurality of pulse components has a pulse width smaller than the pulse width of the overall optical pulse within the predetermined period.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the scope of the invention will be apparent to those skilled in the art from this detailed description.

DESCRIPTION OF THE PREFERRED EMBODIMENTS

Figure 1:
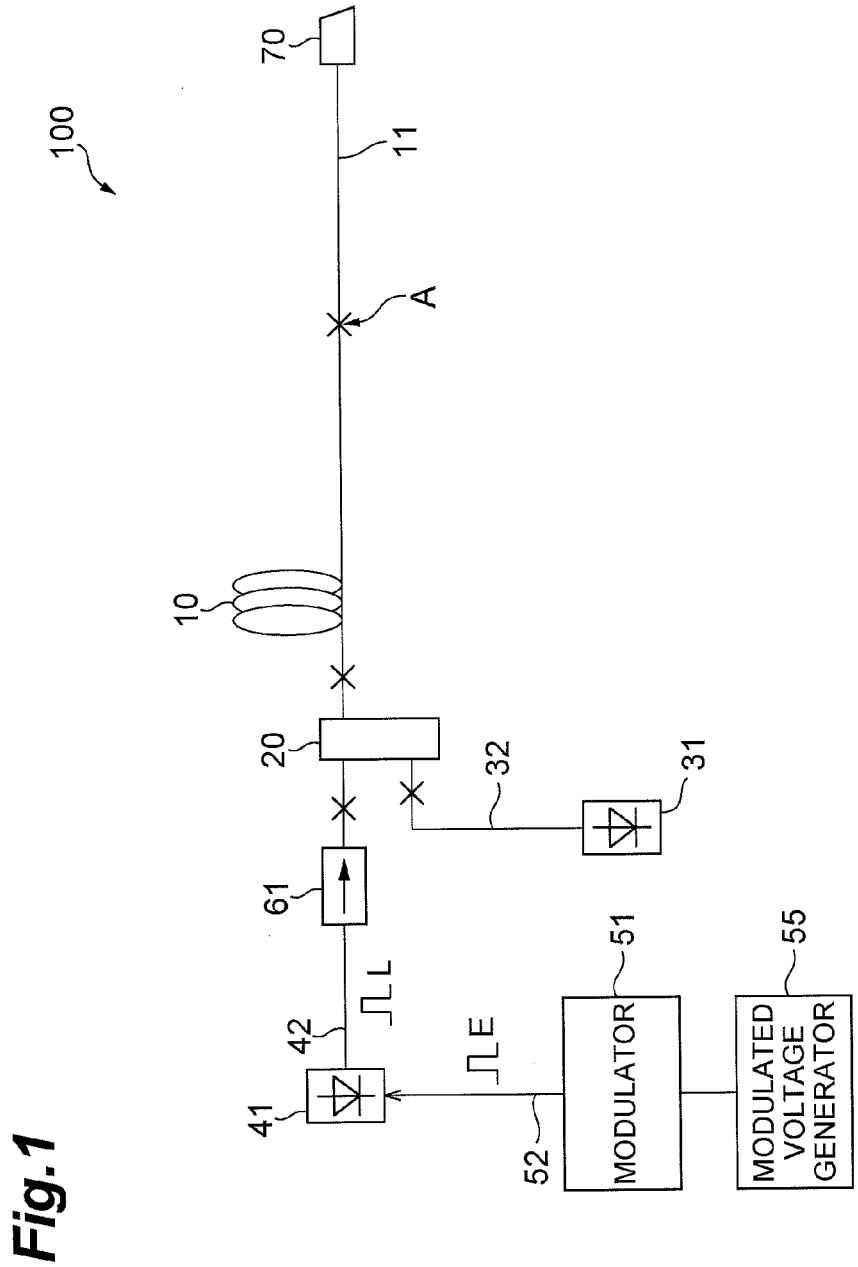
FIG. 1 is a diagram showing a structure of an optical fiber laser (a first embodiment of the optical fiber laser according to the present invention) to which the pulse modulation method according to the present invention is applicable.

In the following, embodiments of the pulse modulation method and optical fiber laser according to the present invention will be explained in detail with reference to FIGS. 1, 2A, 2B, 3, 4A, 4B, and 5 to 18. In the description of the drawings, identical or corresponding components are designated by the same reference numerals, and overlapping description is omitted.

First Embodiment of Optical Fiber Laser

FIG. 1 is a diagram showing the structure of the first embodiment of the optical fiber laser according to the present invention, which is specifically a structure of a MOPA type optical fiber laser. In FIG. 1, the optical fiber laser 100 according to the first embodiment comprises an amplification optical fiber 10, an optical coupler 20, a pumping light source 31, an optical fiber 32, a seed light source 41, an optical fiber 42, a modulator 51, a modulated voltage generator 55, an electric signal line 52, an optical isolator 61, a transmission optical fiber 11, and a light exit end 70. In the optical fiber laser 100 according to the first embodiment, the modulated voltage generator 55 is a function generator or the like which generates a modulation pattern for pulse modulation, and also outputs a modulated voltage. The modulator 51, which functions to modulate the pulse driving of the seed light source 41 itself, is constructed by electronic components within a substrate. The modulated voltage outputted from the modulated voltage generator 55 is fed into the modulator 51, whereby a seed light pulse L is repeatedly produced in the seed light source 41.

In the optical fiber laser 100 according to the first embodiment, pumping light transmitted through the optical fiber 32 from the pumping light source 31 and the seed light pulse (light to be amplified) transmitted through the optical fiber 42 and optical isolator 61 from the seed light source 41 are combined by the optical coupler 20. The composite light from the optical coupler 20 is made incident on one end of the amplification optical fiber 10. Within the amplification optical fiber 10 through which the composite of the pumping light and seed light propagates, a rare-earth element (Yb, Er, Tm, Ho, Nd, Pr, Tb, or the like) added to the amplification optical fiber 10 is pumped with the pumping light, so as to amplify the seed light pulse. The seed light pulse amplified in the amplification optical fiber 10 passes through the transmission optical fiber 11 fusion-spliced to the other end A of the amplification optical fiber 10 and then exits from the light exit end 70 to the outside.

Figure 2A:
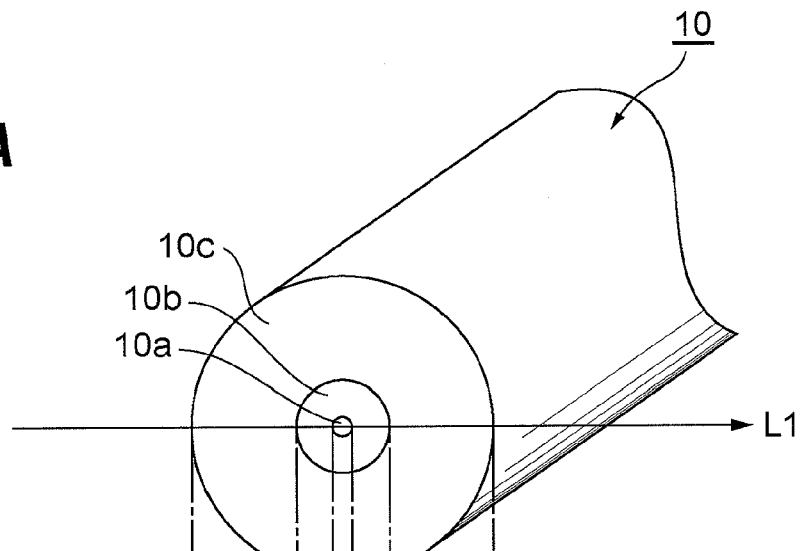
FIGS. 2A and 2B are a view showing a cross-sectional structure of an amplification optical fiber and a refractive index profile thereof, respectively.
Figure 2B:
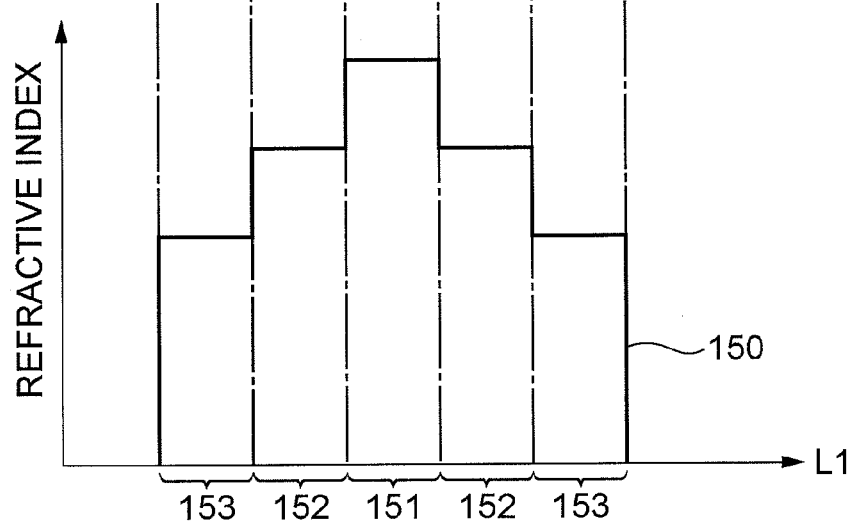

For example, the amplification optical fiber 10 has the cross-sectional structure and refractive index profile shown in FIGS. 2A and 2B. That is, as shown in FIG. 2A, the amplification optical fiber 10 has a core 10a extending along a predetermined axis and having a predetermined refractive index, a first cladding 10b provided on an outer periphery of the core 10a and has a refractive index lower than that of the core 10a, and a second cladding 10c provided on an outer periphery of the first cladding 10b and has a refractive index lower than that of the first cladding 10b. FIG. 2B shows a refractive index profile 150 along a diametrical direction L1 of the amplification optical fiber 10 (a direction orthogonal to the optical axis of the amplification optical fiber 10), in which regions 151, 152, and 153 represent respective refractive indexes of the core 10a, first cladding 10b, and second cladding 10c along the diametrical direction L1. The core 10a, first cladding 10b, and second cladding 10c constitute a double cladding structure. The core 10a propagates the seed light pulse in a single mode, while the first cladding 10b propagates the pumping light in a multimode. The core 10a is doped with Yb as a rare-earth element, whereby the seed light pulse is amplified within the core 10a.

Figure 3:
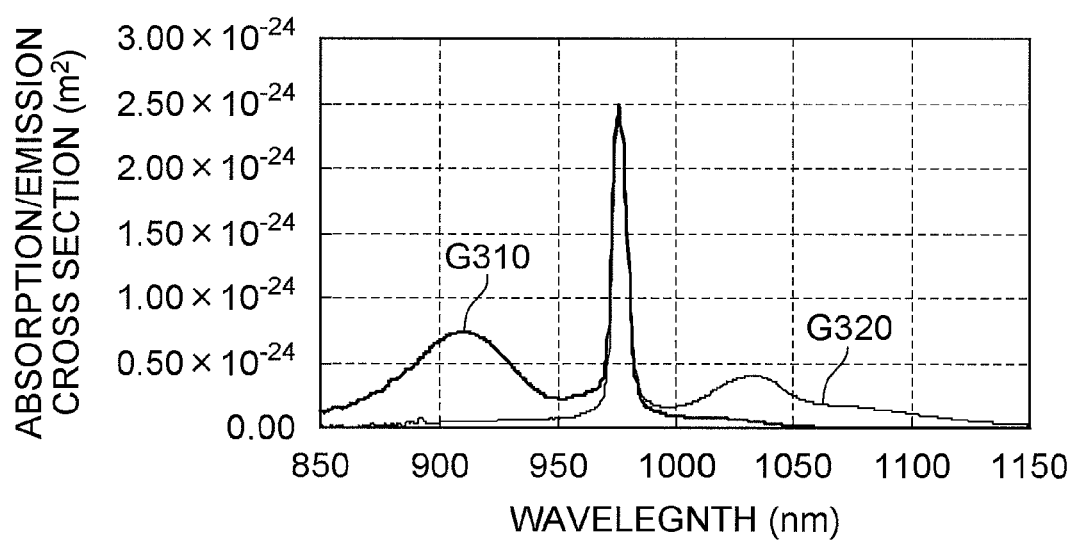
FIG. 3 is a graph showing respective wavelength dependence characteristics of absorption and emission cross-sectional areas of the amplification optical fiber.

The pumping light absorption in the amplification optical fiber 10 is determined by characteristics of the amplification optical fiber 10 and varies mainly depending on how the mode field diameter (MFD), the outer diameter of the first cladding 10b, and the rare-earth element concentration in the core 10a are adjusted. For example, a Yb-doped optical fiber having a length of 5 m in which the dopant concentration is about 10000 ppm, MFD is about 7 μm, and the outer diameter of the first cladding 10b is 130 μm absorbs the pumping light by about 2.4 dB in the pumping wavelength band of 915 nm. In FIG. 3, curves G310 and G320 represent absorption and emission cross-sectional areas, respectively. This Yb-doped optical fiber (corresponding to the amplification optical fiber 10) absorbs the pumping light by about 2.4 dB in the pumping wavelength band of 915 nm. The pumping light wavelength band may be the band of 975 nm and is variable dependent on kinds of rare-earth elements added.

The pumping light source 31 includes an LD, for example. The pumping light source 31 outputs the pumping light in the wavelength band of 915 nm, 940 nm, or 975 nm. The seed light source 41 includes an LD, for example. The modulator 51 applies the modulated voltage E to the seed light source 41 through the electric signal line 52, thereby directly modulating the seed light source 41 (pulse modulation). In the first embodiment, the seed light pulse outputted from the seed light source 41 has a wavelength falling within the wavelength range of 1030 to 1130 nm, which is 1060 nm, for example.

Figure 4A:
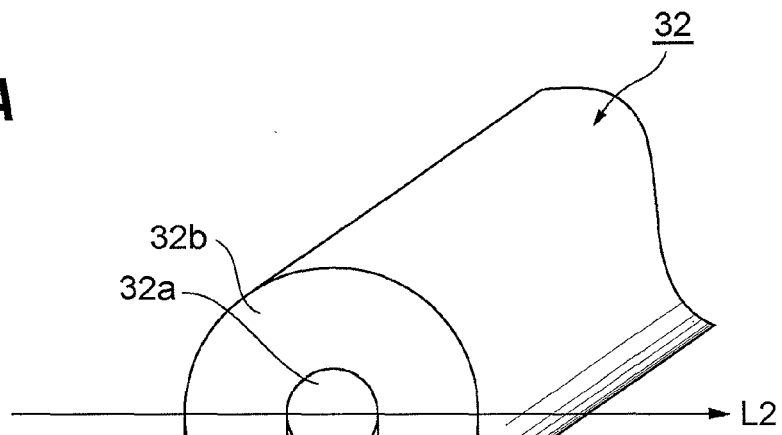
FIGS. 4A and 4B are a view showing a cross-sectional structure of a transmission optical fiber and a refractive index profile thereof, respectively.
Figure 4B:
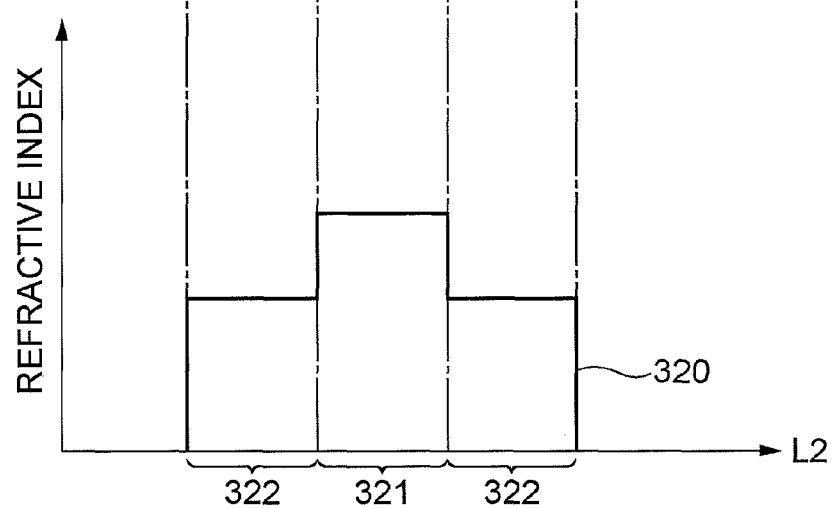

Each of the optical fiber 32 and transmission optical fiber 11 disposed between the pumping light source 31 and optical coupler 20 has the cross-sectional structure and refractive index profile shown in FIGS. 4A and 4B. That is, as shown in FIG. 4A, the optical fiber 32, 11 has a core 32a extending along a predetermined axis and having a predetermined refractive index, and a cladding 32b provided on an outer periphery of the core 32a and has a refractive index lower than that of the core 32a. FIG. 4B shows a refractive index profile 320 along a diametrical direction L2 of the optical fiber 32 (a direction orthogonal to the optical axis of the optical fiber 32), in which regions 321 and 322 represent respective refractive indexes of the core 32a and cladding 32b along the diametrical direction L2. The core 32a propagates the pumping light outputted from the pumping light source 31 in a multimode.

Figure 5:
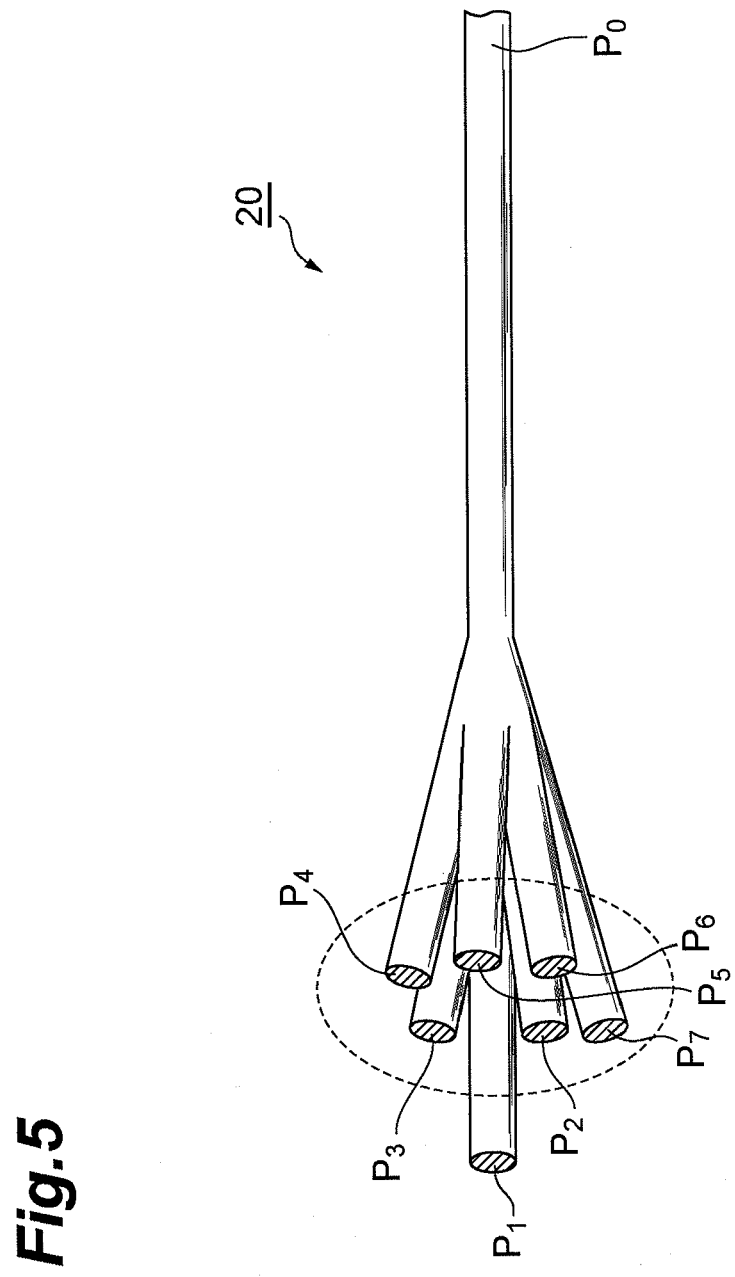
FIG. 5 is a view for explaining a structure of an optical coupler.

FIG. 5 is a view showing the structure of the optical coupler 20. The optical coupler 20 shown in FIG. 5 has a plurality of (7 in the example shown in FIG. 5) optical I/O ports $P_1$ to $P_7$ on one side and a common port $P_0$ on the other side. The optical coupler 20 combines light beams fed into the optical I/O ports $P_1$ to $P_7$ and outputs the resulting composite light from the common port $P_0$. The optical coupler 20 also splits the light fed into the common port $P_0$ and outputs the split light beams from the optical I/O ports $P_1$ to $P_7$, respectively.

The optical fiber on the common port $P_0$ side of the optical coupler 20 has a double cladding structure similar to that of the amplification optical fiber 10 and is connected to the amplification optical fiber 10. The optical I/O port $P_1$ is optically connected to the seed light source 41 through the optical fiber 42. The optical I/O port $P_2$ is optically connected to the pumping light source 31 through the optical fiber 32. The other optical I/O ports $P_3$ to $P_7$ may be optically connected to other pumping light sources through other optical fibers.

Embodiments of the pulse modulation method according to the present invention will now be explained. In the following, a comparative example to be compared with the embodiments will be explained before explaining the embodiments in comparison therewith.

Comparative Example of Pulse Modulation Method

The pulse modulation method according to the comparative example directly modulates the seed light source 41 in the optical fiber laser 100 shown in FIG. 1, so as to perform pulse modulation.

Figure 6:
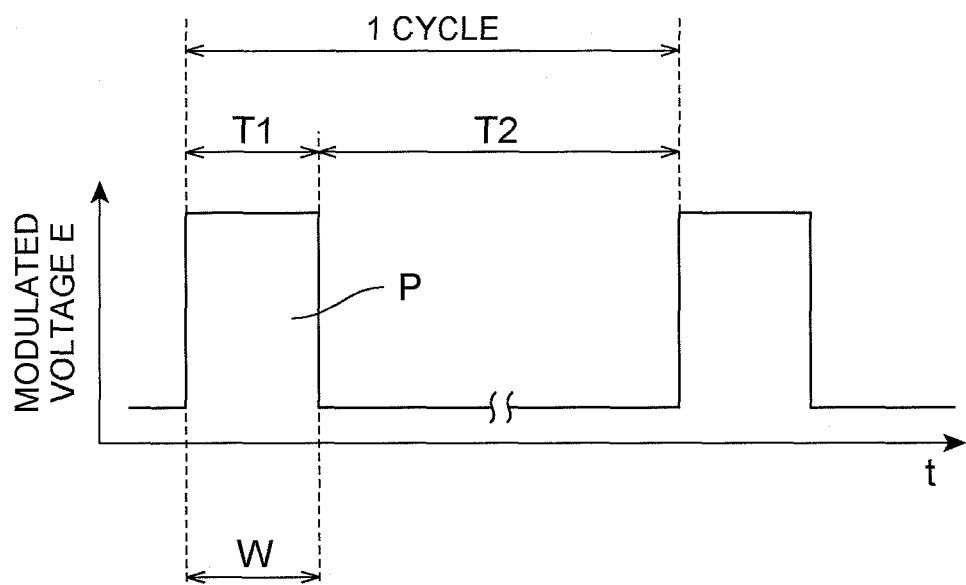
FIG. 6 is a chart for explaining the pulse modulation method according to a comparative example.

FIG. 6 shows a modulation pattern of the modulated voltage E applied from the modulator 51 to the seed light source 41 in the pulse modulation method according to the comparative example. The modulation pattern, which is a modulated voltage fed into the modulator 51, is inputted from a function generator or voltage generator and used for producing an optical pulse. A modulation period in the modulation pattern corresponds to one cycle of an optical pulse to be produced and is constituted by a signal ON period T1 and a signal OFF period T2. The signal ON period T1 is a period in which a pulse component P having a signal width W is substantially applied to the seed light source 41. Particularly, in the pulse modulation method according to the comparative example, the driving voltage applied to the seed light source 41 is modulated with a prepetition frequency of 50 kHz and a pulse signal width of 30 ns in the pulse component P. Though the modulated voltage having a signal width of 30 ns can be applied to the seed light source 41, the signal width depends on the response (rise/fall factor) of the light source and electronic circuits mounted for pulse modulation, whereby the signal ON period T1 (pulse component P) and signal OFF period T2 may have time widths different from each other in the modulation pattern.

Though simply applying the modulated voltage having a signal width of 30 ns to the seed light source 41 does not cause a problem leading to destructions of optical components constituting the optical fiber laser 100 in particular, SBS has been known to emerge within the amplification optical fiber 10 in the process of amplifying the modulated seed light pulse in this comparative example. Continuing an amplifying operation while keeping the state where the SBS emerges may damage the optical components constituting the optical fiber laser 100 shown in FIG. 1, the pumping light source, and the like. Examples of methods considered for evading the above-mentioned SBS include those lowering nonlinear thresholds of the amplification optical fiber 10 per se, such as those increasing the core diameter of the amplification optical fiber 10 and shortening the amplification optical fiber 10.

Known as one of parameters depending on the threshold and gain of SBS is the spectrum width of incident light (fiber pumping component). The following expression (1) represents their relationship. Since the laser light propagating through the core of the amplification optical fiber 10 becomes a fiber pumping component in the structure of FIG. 1, the threshold and gain of SBS depend on the spectrum width of this laser light.

$$\tilde{g}_B = \frac{\Delta v_B}{\Delta v_B + \Delta v_P} g_B(v_B) \quad (1)$$

$\tilde{g}_B$ is the Brillouin gain taking account of the fiber pumping component;
$g_B(v_B)$ is the Brillouin gain factor of the fiber itself;
$\Delta v_B$ is the spectrum width of the Brillouin gain; and
$\Delta v_p$ is the spectrum width of the fiber pumping component.

As can be seen from the above-mentioned expression (1), the Brillouin gain lowers by $\Delta v_p/\Delta v_B$ times when $\Delta v_p \gg \Delta v_B$. The seed light (laser light) of the LD acting as the seed light source 41 has the relationship of $\Delta v_p \gg \Delta v_B$, whereby the Brillouin gain depends on the spectrum width of the seed light (spectrum width of the fiber pumping component). That is, the Brillouin gain becomes smaller as the spectrum width is greater.

When the modulated voltage having a signal width of 30 ns is applied from the modulator 51 to the seed light source 41 as in this comparative example, for instance, the measured value of the half width of the outputted seed light pulse is about 0.6 nm. On the other hand, the spectrum half width at the time of a CW operation without the pulse modulation is about 1.1 nm. Thus, the spectrum half width of the pulse-modulated seed light becomes about half that obtained at the time of the CW operation. It is also seen from the above-mentioned expression (1) that the gain value of SBS per se becomes greater.

Figure 7:
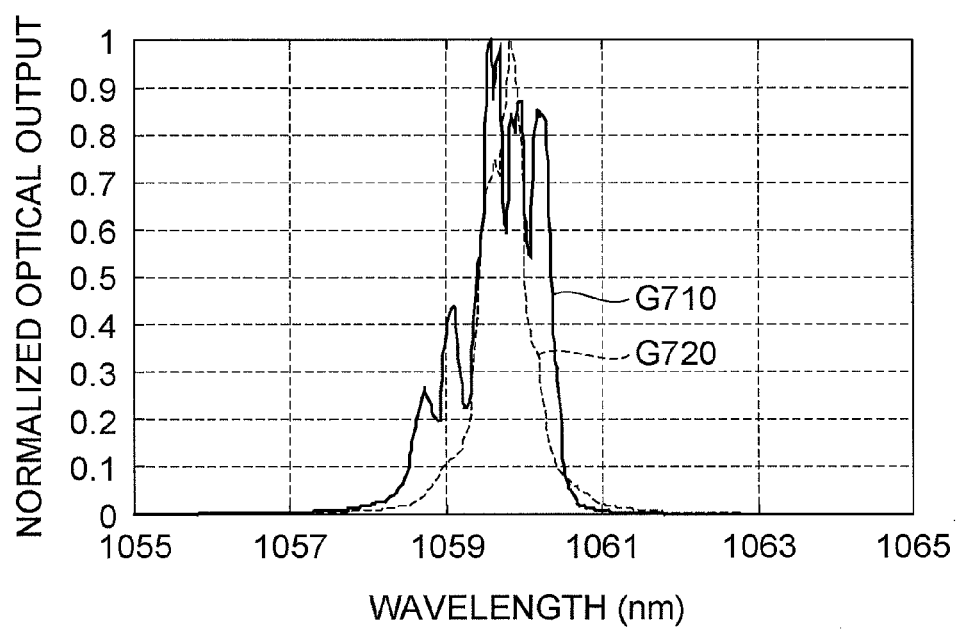
FIG. 7 is a graph showing respective normalized spectra of an optical pulse pulse-modulated by the pulse modulation method according to the comparative example as seed light and CW light employed as the seed light.

FIG. 7 shows respective normalized spectra of an optical pulse (curve G720) pulse-modulated (with a signal width of 30 ns) by the pulse modulating method according to the comparative example as the seed light and continuous light (curve G710) employed as the seed light. As can be seen from FIG. 7, the spectrum half width becomes narrower as the pulse width of the seed light pulse is greater. Hence, simply expanding the pulse width of the seed light cannot stop the increase of SBS from damaging individual parts of the optical fiber laser 100.

First Embodiment of Pulse Modulation Method

Figure 8:
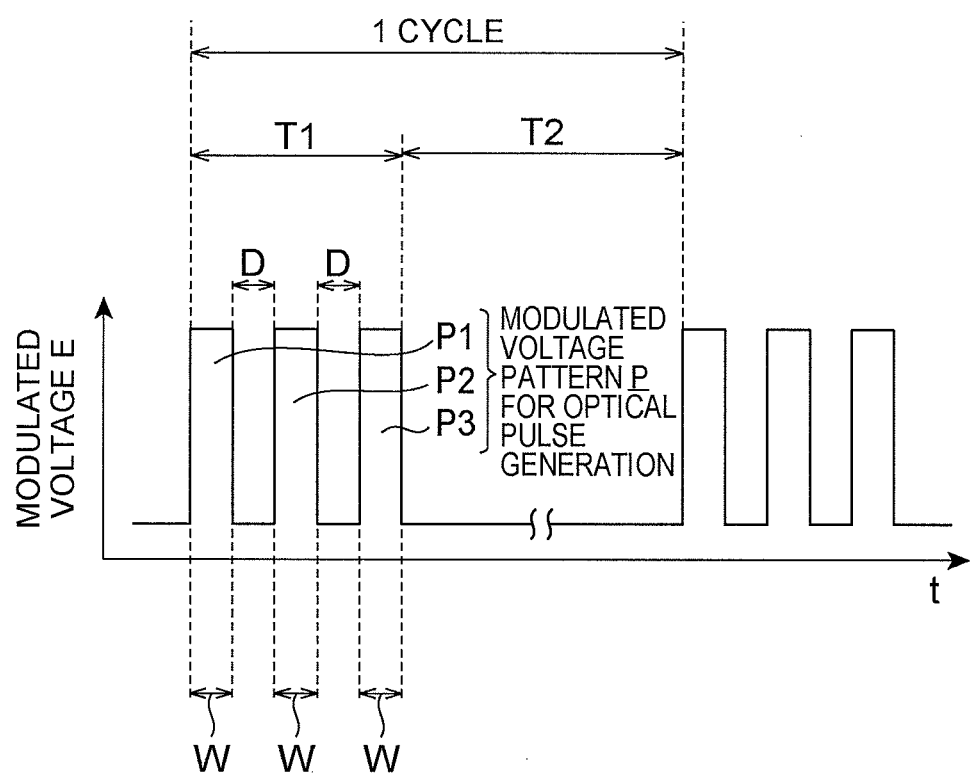
FIG. 8 is a chart for explaining a first embodiment of the pulse modulation method according to the present invention.

The first embodiment of the pulse modulation method according to the present invention will now be explained. In the following, operations in the case where the pulse modulation method is applied to the optical fiber laser 100 shown in FIG. 1 will be explained. Hence, this pulse modulation method is achieved when the modulator 51 directly modulates the seed light source 41. FIG. 8 is a chart for explaining the first embodiment of the pulse modulation method according to the present invention. That is, the modulated voltage E applied from the modulator 51 to the seed light source 41 is adjusted according to the modulation pattern shown in FIG. 8. A modulation period in the modulation pattern of the modulated voltage E corresponds to one cycle of an optical pulse to be produced and is constituted by a signal ON period T1 and a signal OFF period T2. In the signal ON period T in the pulse modulation method according to the first embodiment, a modulated voltage pattern P for optical pulse generation is constituted by a plurality of pulse components $P_1$ to $P_3$ each having a signal width W shorter than the pulse width of one optical pulse to be produced. The plurality of pulse components $P_1$ to $P_3$ are arranged such as to alternate with signal intervals D. In the first embodiment, the modulated voltage pattern P is constituted by the three pulse components $P_1$ to $P_3$ under the condition that the signal width W is 10 ns, while the signal interval D of the pulse components is 10 ns. Here, the pulse components $P_1$ to $P_3$ have the same modulated voltage (peak voltage value) and the same driving current value applied to the seed light source 41. The signal intervals D alternating with the pulse components $P_1$ to $P_3$ may also be set to 5 ns, 2 ns, or 1 ns or less.

Figure 9:
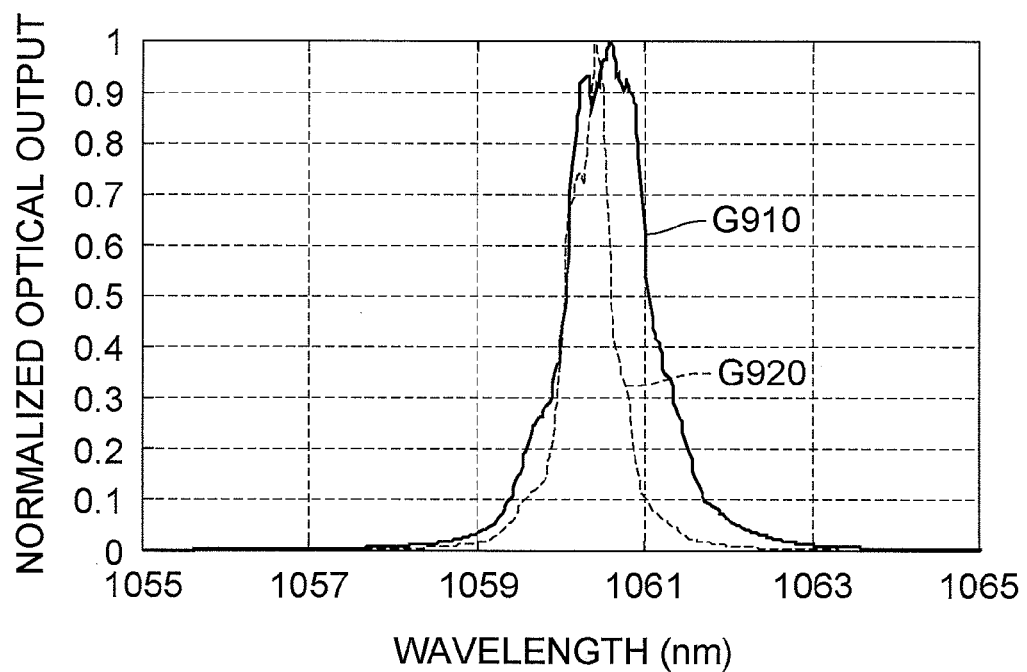
FIG. 9 is a graph showing respective normalized spectra of an optical pulse pulse-modulated by the pulse modulation method according to the first embodiment as the seed light and an optical pulse pulse-modulated by the pulse modulation method according to the comparative example as the seed light.

FIG. 9 is a graph showing respective normalized spectra of an optical pulse pulse-modulated by the pulse modulation method according to the first embodiment as the seed light and an optical pulse pulse-modulated by the pulse modulation method according to the comparative example as the seed light. In FIG. 9, curve G920 represents the seed light pulse obtained by the pulse modulation in which the signal width W of the modulated voltage pattern of comparative example is set to 30 ns. Curve G910 is the seed light pulse obtained by the pulse modulation according to the modulated voltage pattern P constituted by the three pulse components $P_1$ to $P_3$ each having a signal width W of 10 ns.

The half width of the seed light pulse becomes 1.03 nm in the case of the modulated voltage pattern P constituted by the three pulse components $P_1$ to $P_3$ with a signal interval D of 10 ns and a signal width W of 10 ns, and 0.8 nm in the case of the modulated voltage pattern P constituted by the three pulse components $P_1$ to $P_3$ with a signal interval D of 5 ns and a signal width W of 10 ns. It can be seen from the result of comparison of the spectrum widths shown in FIG. 9 that each of the above-mentioned cases yields a longer half width than that in the case of pulse modulation in which the signal width W of the modulated voltage pattern of comparative example is simply set to 30 ns.

As for the difference between a modulated voltage pattern for optical pulse generation, constituted by arranging three pulse components in a row while alternating them with signal intervals D, and a modulated voltage pattern for optical pulse generation having a long signal width W, the same pulse energy can be obtained as a response of the Yb-doped fiber when their input power is the same within one cycle. Therefore, the peak value of one pulse component having a signal width W of 10 ns in the modulated voltage pattern constituted by three such pulse components is about ⅓ that of the modulated voltage pattern having a signal width W of 30 ns. This principle does not depend on whether the signal interval D between the pulse components is large or small.

Figure 10:
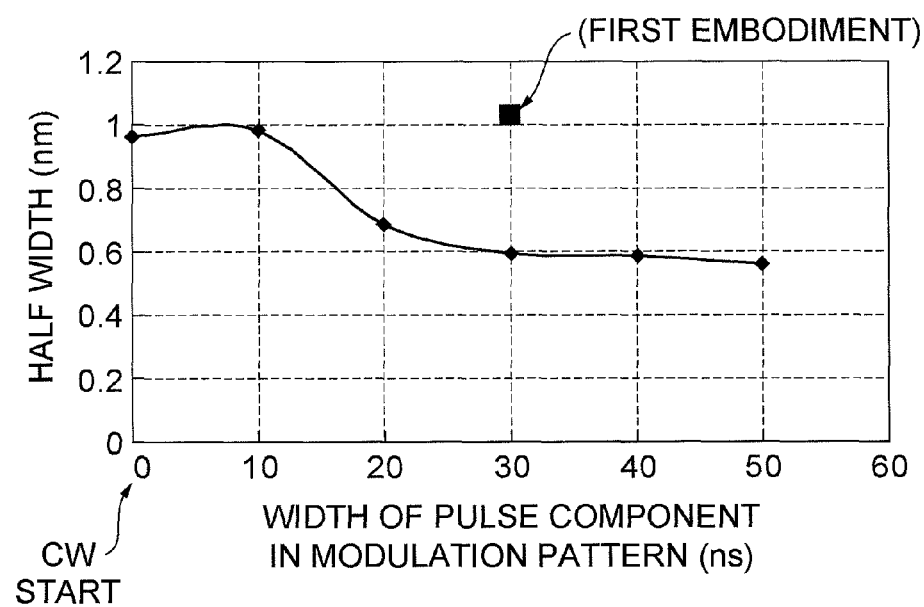
FIG. 10 is a chart for explaining the relationship between the signal width of one pulse component in a modulation pattern and the normalized full width at half maximum of the seed light pulse.

FIG. 10 is a chart for explaining the relationship between the signal width W of one pulse component in a modulation pattern and the normalized half width of the seed light pulse. FIG. 10 also plots the half width of the seed light pulse pulse-modulated by three pulse components each of which is set to the signal width W of 10 ns (first embodiment) as reference data.

As can be seen from FIG. 10, the half width of the seed light pulse obtained by the pulse modulation becomes narrower as the signal width W of one pulse component is greater. It can also be seen that the half width of the seed light pulse (about 1.03 nm as seen from FIG. 9) obtained when the modulated voltage pattern P is constituted by the three pulse components each having a signal width W of 10 ns is clearly greater than that obtained when the modulated voltage pattern is constituted by one pulse component having a signal width W of 30 ns (comparative example). This result can expect an SBS reducing effect to emerge within the amplification optical fiber 10 when the modulated voltage E of the modulated voltage pattern P in which a plurality of pulse components each having a narrow signal width W are arranged in a row is applied from the modulator 51 to the seed light source 41. Though optical pulses having shorter pulse widths have been known to be less susceptible to SBS, it has not been attempted to reduce the influence of SBS by adjusting the modulation pattern for pulse modulation without reducing the pulse width of optical pulses as far as the inventors know.

Second Embodiment of Pulse Modulation Method

Figure 11:
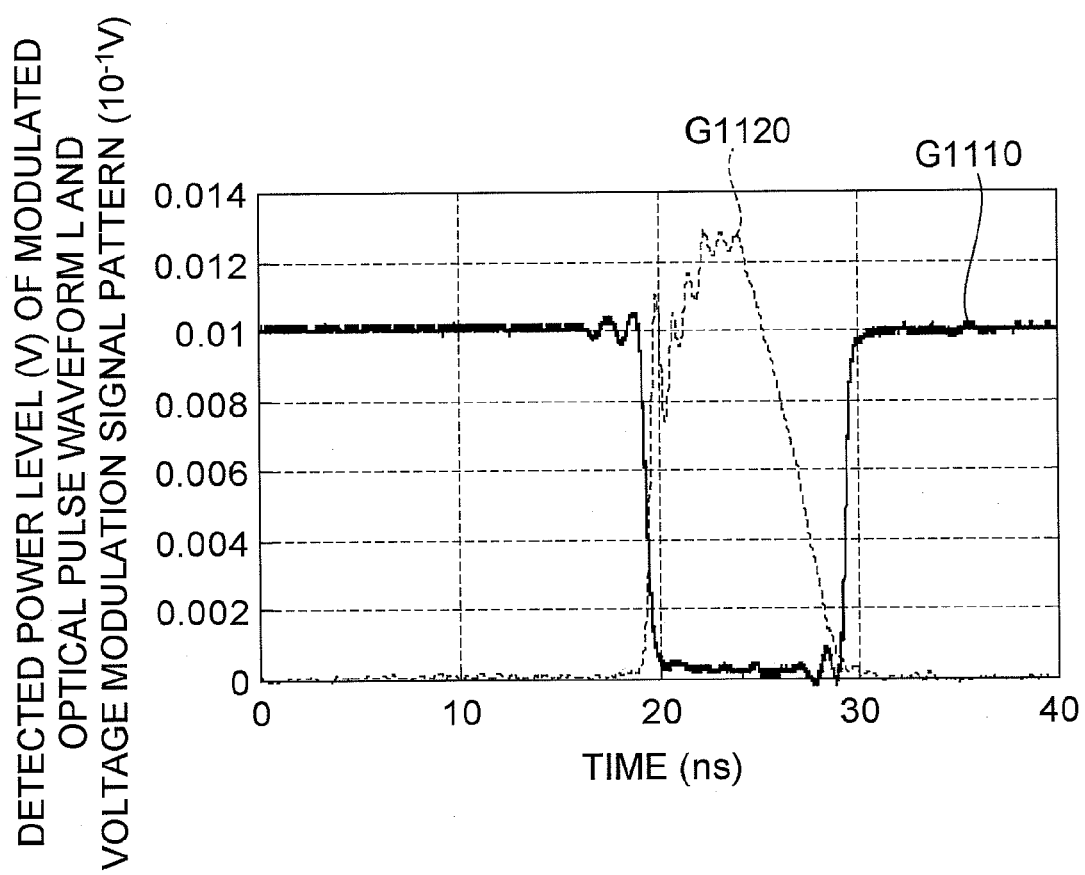
FIG. 11 is a graph showing the relationship between the waveform of the pulse-modulated optical pulse and modulation pattern.

The pulse modulation method according to the present invention can utilize the effect of pulse components overlapping each other by making the signal interval D of the pulse components $P_1$ to $P_3$ in the modulation pattern of the modulated voltage E shorter than each signal width W. As for a photoelectric transducer, the effect also depends on the rise/fall time (hereinafter referred to as Tr/Tf) of the seed light pulse when one pulse component is provided, whereby the pulse components are harder to overlap each other as the Tr/Tf of the seed light pulse is faster when the modulated voltage is applied. Tr and Tf herein refer to times when the intensity reaches 10% and 90% of the peak voltage value, respectively. FIG. 11 shows results of responses obtained when one pulse component having a signal width W of 10 ns is imparted to the seed light source 41. In FIG. 11, curves G1110 and G1120 represent a modulation pattern of the modulated voltage E and the waveform of the seed light pulse when the modulation pattern is provided, respectively. As shown in FIG. 11, the LD acting as the seed light source 41 is relatively slow to respond and yields a rise time of about 4.6 ns and a fall time of about 9.4 ns. Therefore, even when the signal width W is 10 ns, the modulation pattern and the optical pulse response may deviate from each other if the signal interval D between the pulse components is narrowed. The second embodiment of the pulse modulation method according to the present invention, which has been completed according to the foregoing studies, will now be explained in detail with reference to FIGS. 12 and 13.

Figure 12:
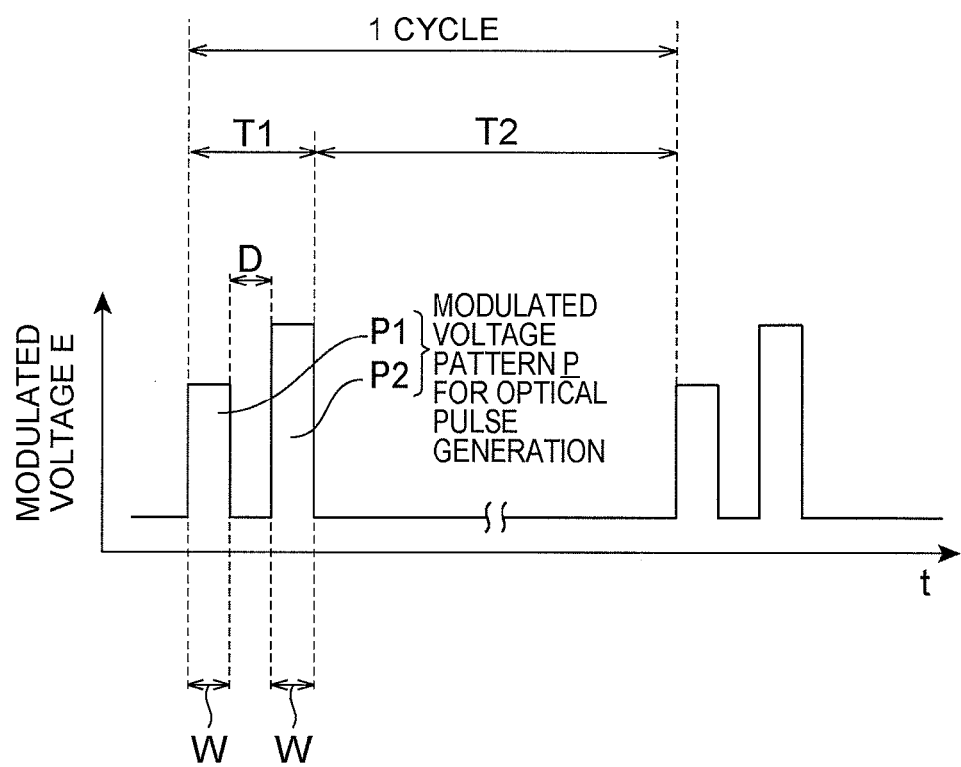
FIG. 12 is a chart for explaining a second embodiment of the pulse modulation method according to the present invention.
Figure 13:
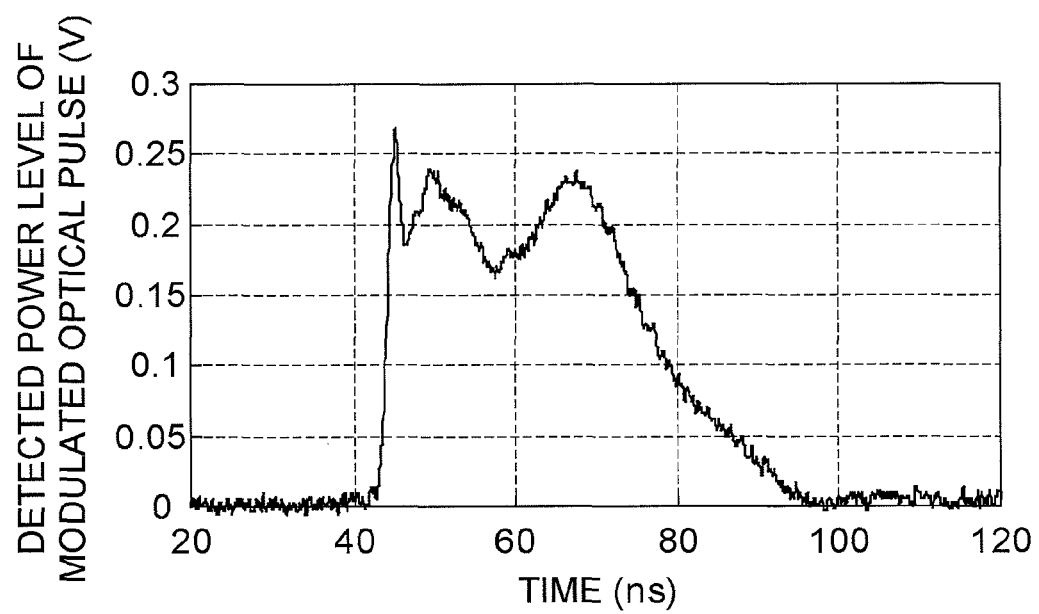
FIG. 13 is a graph showing the detected power level of an optical pulse pulse-modulated by the pulse modulation method according to the second embodiment.

FIG. 12 is a chart for explaining the second embodiment of the pulse modulation method according to the present invention. FIG. 13 is a graph showing the detected power level of an optical pulse pulse-modulated by the pulse modulation method according to the second embodiment.

The pulse modulation method according to the second embodiment adjusts the modulated voltage E applied from the modulator 51 to the seed light source 41, in accordance with the modulation pattern shown in FIG. 12. A modulation period in the modulation pattern corresponds to one cycle of an optical pulse to be produced and is constituted by a signal ON period T1 and a signal OFF period T2. In the pulse modulation method according to the second embodiment, the modulated voltage pattern P in the signal ON period T1 is constituted by a plurality of pulse components $P_1$, $P_2$ each having a signal width W shorter than the pulse width of one optical pulse to be produced, while the signal interval D between these two components $P_1$, $P_2$ is set shorter than each signal width W. Thus, the pulse modulation method according to the second embodiment can let seed optical pulses to be produced overlap each other by narrowing the signal interval D between these two pulse components $P_1$, $P_2$ in order to utilize the delay in response of the LD acting as the seed light source 41.

In the second embodiment, in view of the overlap between the seed light pulses, the signal width W of each of the two pulse components $P_1$, $P_2$ and their signal interval D are set to 20 ns and 2 ns, respectively. As a result, the full width at half maximum of the optical pulse finally outputted from the optical fiber laser 100 is about 35 ns. That is, the pulse modulation method according to the second embodiment can produce an optical pulse having a full width at half maximum of 30 ns or greater, which has not been attained in the comparative example because of the SBS generated therein. Since the amplification gain within the amplification optical fiber 10 is high here, the modulated voltage peak value of the first pulse component $P_1$ is set to 0.6 times that of the second pulse component $P_2$. This can relax transient responses in the optical amplification.

Third Embodiment of Pulse Modulation Method

Figure 14:
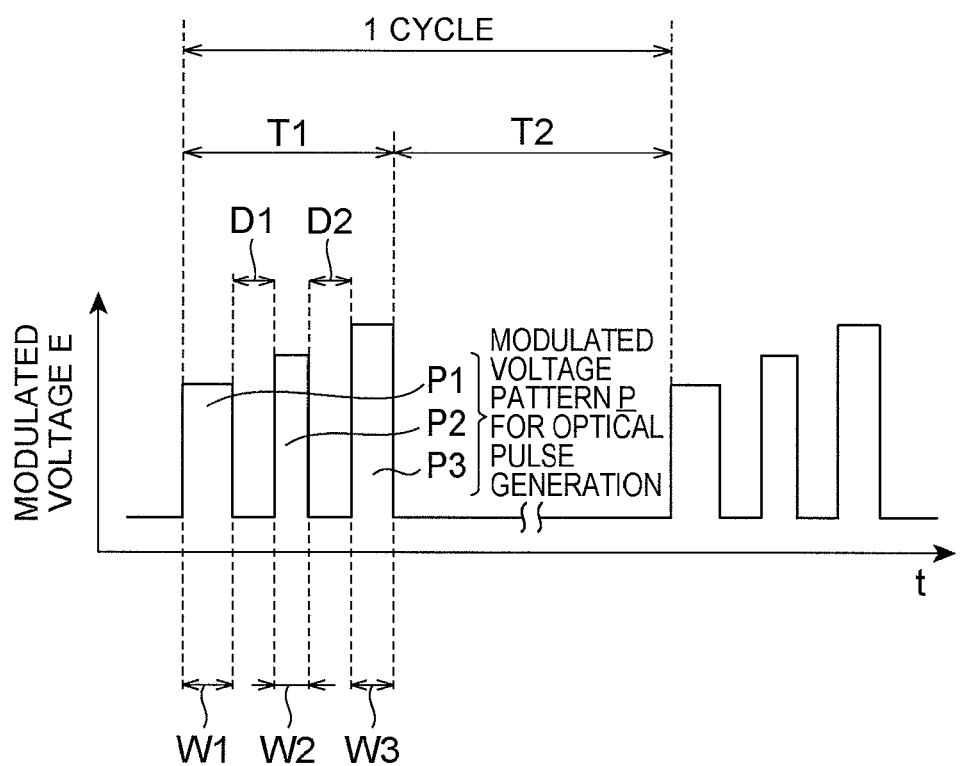
FIG. 14 is a chart for explaining a third embodiment of the pulse modulation method according to the present invention.

FIG. 14 is a chart for explaining the third embodiment of the pulse modulation method according to the present invention. When the amplification gain within the amplification optical fiber 10 is large in the pulse modulation method according to the third embodiment, a difference may occur in the detected power level of optical pulses outputted from the optical fiber laser 100. Therefore, the pulse modulation method according to the third embodiment makes the modulated voltage E fed to the seed light source 41 for producing the seed light pulse vary among the pulse components. That is, according to the modulation pattern shown in FIG. 14, the pulse modulation method according to the third embodiment adjusts the modulated voltage E applied from the modulator 51 to the seed light source 41. A modulation period in the modulation pattern of the modulated voltage E corresponds to one cycle of an optical pulse to be produced and is constituted by a signal ON period T1 and a signal OFF period T2. In the pulse modulation method according to the third embodiment, the modulated voltage pattern P in the signal ON period T1 is constituted by a plurality of pulse components $P_1$ to $P_3$ each having a signal width W shorter than the pulse width of one optical pulse to be produced, while each of the signal intervals D alternating with the three pulse components $P_1$ to $P_3$ is set shorter than each signal width W. Here, the signal widths W1 to W3 may be either different or identical. The signal intervals D1 and D2 may also be either different or identical.

This structure can also make it possible to expand the pulse width of the seed light pulse, while effectively inhibiting the SBS from emerging within the amplification optical fiber 10.

Fourth Embodiment of Pulse Modulation Method

Figure 15:
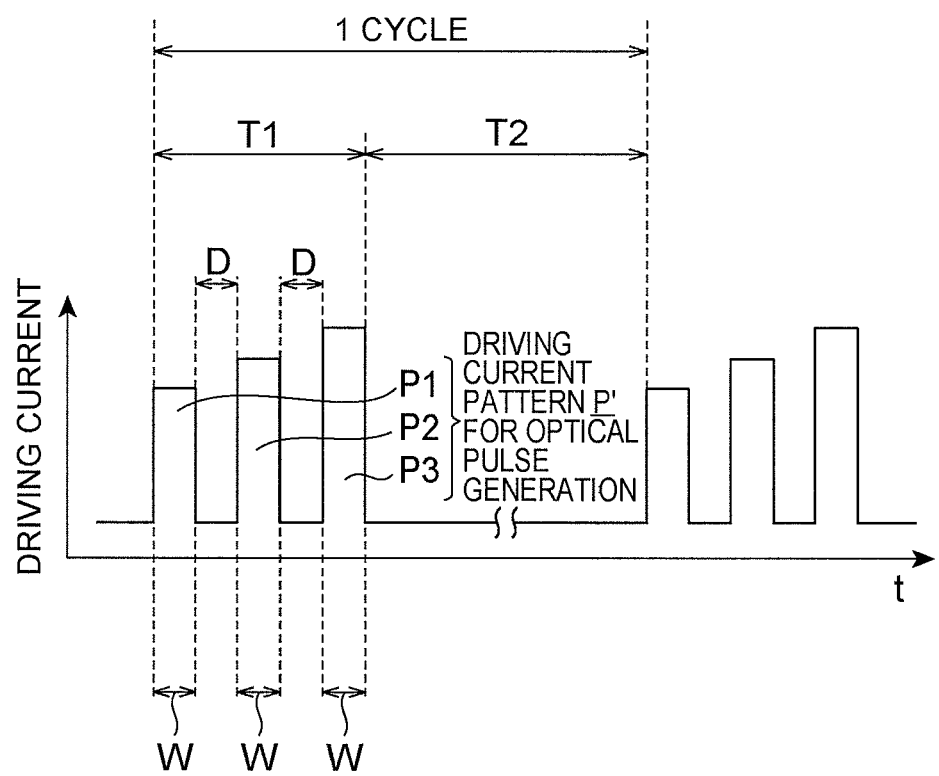
FIG. 15 is a chart for explaining a fourth embodiment of the pulse modulation method according to the present invention.

FIG. 15 is a chart for explaining the fourth embodiment of the pulse modulation method according to the present invention. The pulse modulation method according to the fourth embodiment modulates the driving current value supplied to the seed light source 41 so as to make it coincide with the modulation timing of the modulated voltage E.

That is, the pulse modulation method according to the fourth embodiment modulates the driving current supplied from the modulator 51 to the seed light source 41, in accordance with the modulation pattern shown in FIG. 15. A modulation period in the modulation pattern corresponds to one cycle of an optical pulse to be produced and is constituted by a signal ON period T1 and a signal OFF period T2. In the pulse modulation method according to the fourth embodiment, a driving current pattern P' for optical pulse generation in the signal ON period T1 is constituted by a plurality of pulse components $P_1$ to $P_3$ each having a signal width W shorter than the pulse width of one optical pulse to be produced, while each of the signal intervals D alternating with the three pulse components $P_1$ to $P_3$ is set shorter than each signal width W. Though the pulse components $P_1$ to $P_3$ have different modulated voltage peak values in order to reduce the influence of transient responses at the time of optical amplification, the signal widths W and signal intervals D may be either identical or different.

This structure can also make it possible to expand the pulse width of the seed light pulse, while effectively inhibiting the SBS from emerging within the amplification optical fiber 10.

Though direct modulation schemes in the optical fiber laser 100 according to the first embodiment shown in FIG. 1 are explained as embodiments of the pulse modulation method according to the present invention in the foregoing, the embodiments of the pulse modulation method according to the present invention are applicable to optical fiber lasers having various structures as a matter of course. Typical structures of various optical fiber lasers to which the pulse modulation scheme according to the present invention is applicable will now be explained.

Second Embodiment of Optical Fiber Laser

Figure 16:
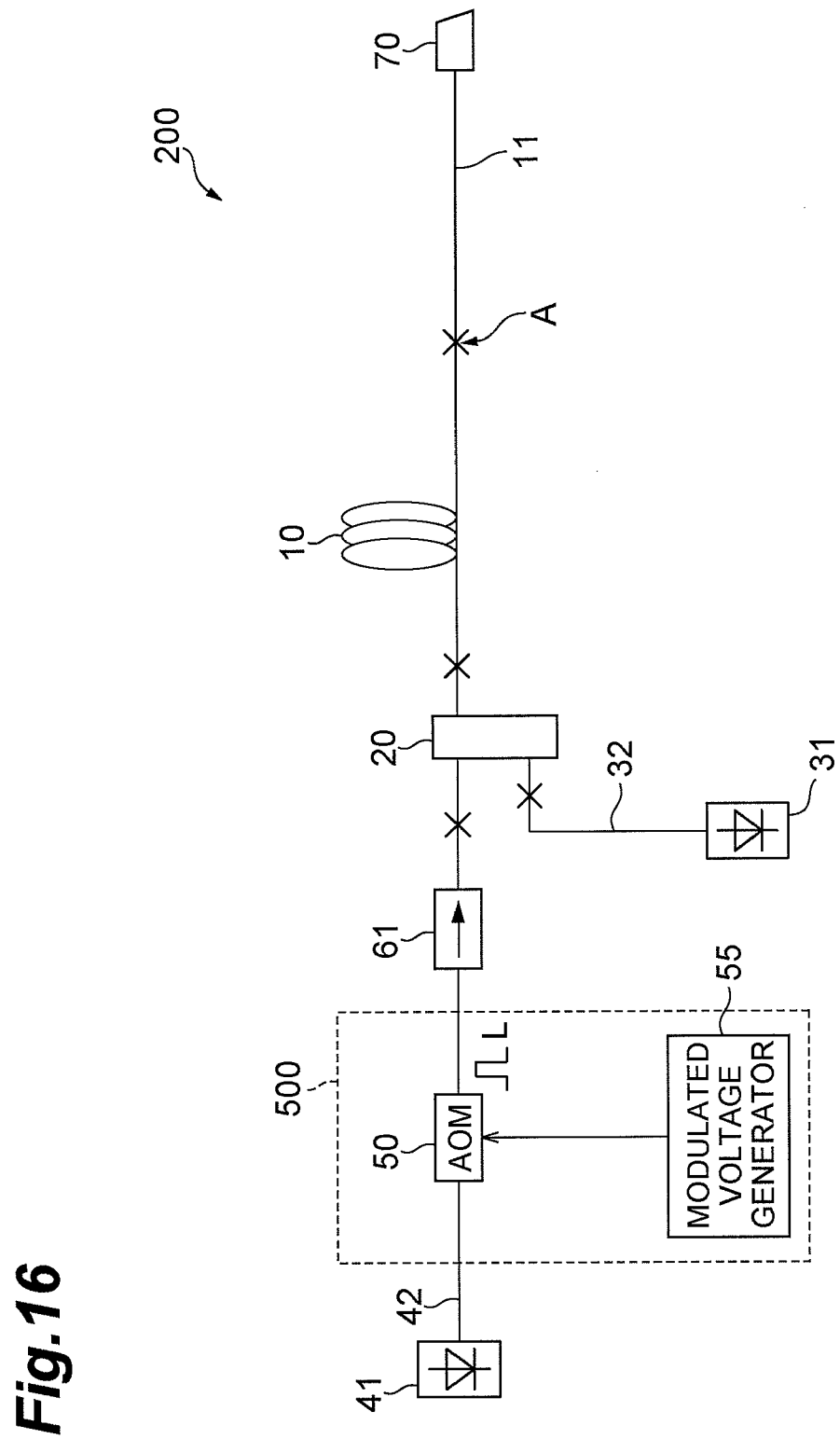
FIG. 16 is a diagram showing a structure of a second embodiment of the optical fiber laser according to the present invention.

FIG. 16 is a diagram showing the structure of the second embodiment of the optical fiber laser according to the present invention. In FIG. 16, the optical fiber laser 200 according to the second embodiment has the same structure as that of the optical fiber laser 100 according to the first embodiment in that it comprises an amplification optical fiber 10, an optical coupler 20, a pumping light source 31, an optical fiber 32, a seed light source 41, an optical fiber 42, a modulated voltage generator 55, an electric signal line 52, an optical isolator 61, a transmission optical fiber 11, and a light exit end 70. However, while the optical fiber laser 100 according to the first embodiment has a direct modulation type structure in which the modulator 51 modulates the seed light source 41, the optical fiber laser 200 according to the second embodiment has an external modulation type structure. Specifically, the optical fiber laser 200 according to the second embodiment further comprises an acousto-optic modulator (AOM) 50 between the seed light source 41 and optical isolator 61. The AOM 50 is a modulator by itself. Therefore, when a modulation pattern is fed to the AOM 50 from the modulated voltage generator 55, the AOM 50 pulses the light outputted from the seed light source 41 according to the modulation pattern. In this second embodiment, the AOM 50 and modulated voltage generator 55 construct a pulse modulator 500.

In the optical fiber laser 200 according to the second embodiment, the modulator 500 can perform any of the pulse modulation methods according to the first to fourth embodiments mentioned above.

Third Embodiment of Optical Fiber Laser

Figure 17:
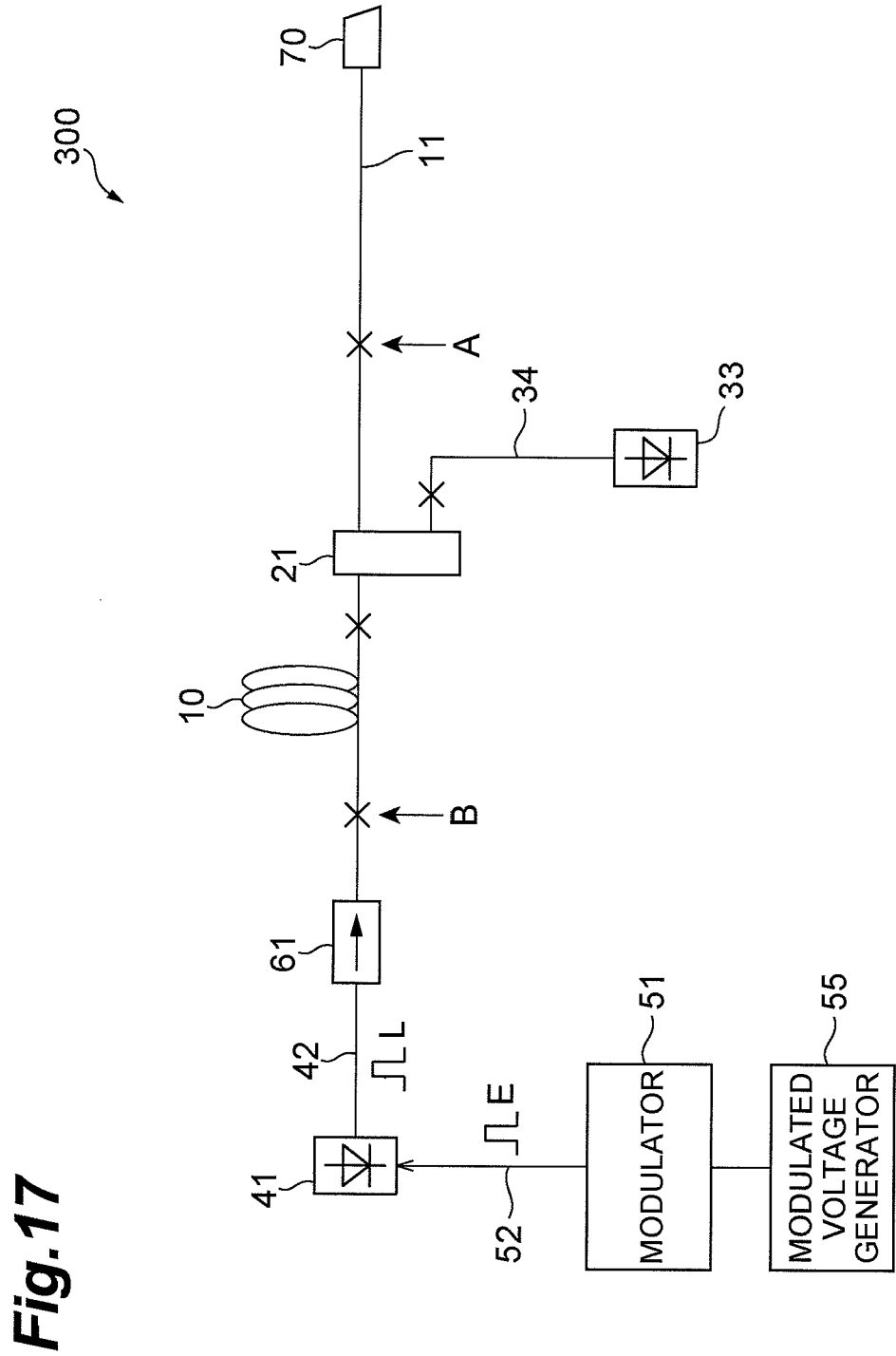
FIG. 17 is a diagram showing a structure of a third embodiment of the optical fiber laser according to the present invention.

FIG. 17 is a diagram showing the structure of the third embodiment of the optical fiber laser according to the present invention. The optical fiber laser 300 according to the third embodiment is the same as the first embodiment in terms of the structure in which the modulator 51 directly modulates the seed light source 41, but differs therefrom in terms of the pumping method. That is, the optical fiber laser 300 according to the third embodiment and the optical fiber laser 100 according to the first embodiment structurally differ from each other in that they have structures for performing backward pumping and forward pumping, respectively.

In particular, the optical fiber laser 300 shown in FIG. 17 comprises an amplification optical fiber 10, an optical divider 21, a pumping light source 33, an optical fiber 34, a seed light source 41, an optical fiber 42, a modulator 51, a modulated voltage generator 55, an electric signal line 52, an optical isolator 61, a transmission optical fiber 11, and a light exit end 70.

In the optical fiber laser 300 according to the third embodiment, the light entrance end of the amplification optical fiber 10 is fusion-spliced to the light exit end of the optical isolator 61 at point B. On the other hand, the optical divider 21 is arranged on the light exit end side of the amplification optical fiber 10. The optical divider 21 has the same structure as with the optical coupler 20 shown in FIG. 5, while the optical I/O port $P_0$ is connected to the light exit end of the amplification optical fiber 10. On the other hand, one of the optical I/O ports $P_1$ to $P_7$ is optically connected to the pumping light source 33 through the optical fiber 34, while another is fusion-spliced to the light entrance end of the transmission optical fiber 11 at point A.

The foregoing structures allow the optical fiber laser 300 according to the third embodiment to perform backward pumping. In the optical fiber laser 300 according to the third embodiment, the modulator 51 can perform any of the pulse modulation methods according to the first to fourth embodiments mentioned above.

Fourth Embodiment of Optical Fiber Laser

Figure 18:
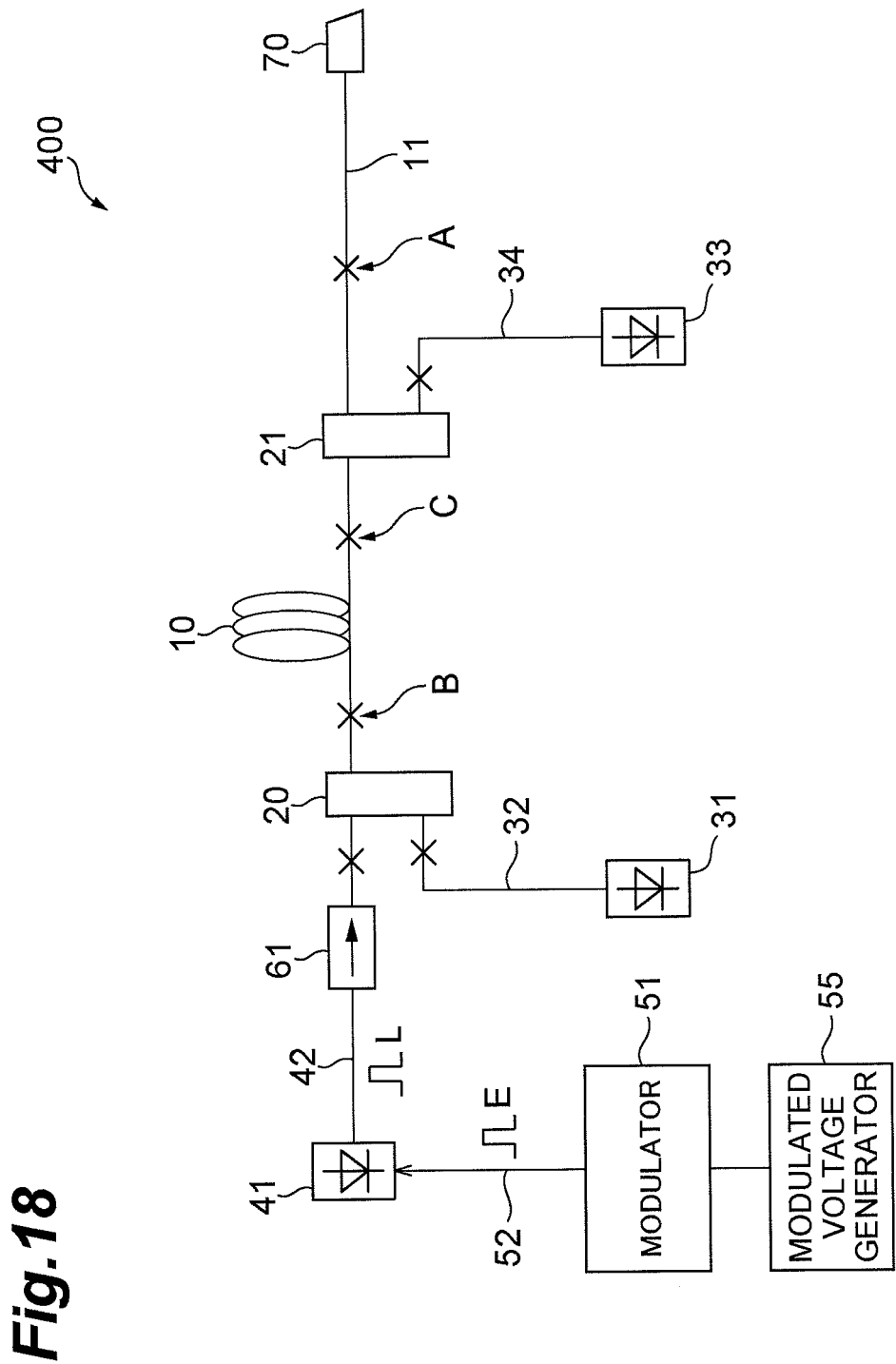
FIG. 18 is a diagram showing a structure of a fourth embodiment of the optical fiber laser according to the present invention.

FIG. 18 is a diagram showing the structure of the fourth embodiment of the optical fiber laser according to the present invention. The optical fiber laser 400 according to the fourth embodiment is also the same as the first embodiment in terms of the structure in which the modulator 51 directly modulates the seed light source 41, but differs therefrom in terms of the pumping method. That is, the optical fiber laser 400 according to the fourth embodiment and the optical fiber laser 100 according to the first embodiment structurally differ from each other in that they have structures for performing bidirectional pumping and forward pumping, respectively.

In particular, the optical fiber laser 400 according to the fourth embodiment shown in FIG. 18 comprises an amplification optical fiber 10, an optical coupler 20, an optical divider 21, pumping light sources 31, 33, optical fibers 32, 34, a seed light source 41, an optical fiber 42, a modulator 51, a modulated voltage generator 55, an electric signal line 52, an optical isolator 61, a transmission optical fiber 11, and a light exit end 70.

In the optical fiber laser 400 according to the fourth embodiment, the optical coupler 20 is arranged on the light entrance end side of the amplification optical fiber 10, while the optical divider 21 is arranged on the light exit end side of the amplification optical fiber 10. The optical I/O port $P_0$ of the optical coupler 20 is fusion-spliced to the light entrance end of the amplification optical fiber 10 at point B. One of the optical I/O ports $P_1$ to $P_7$ of the optical coupler 20 is optically connected to the light exit end of the optical isolator 61, while another is optically connected to the pumping light source 31 through the optical fiber 32. The optical I/O port $P_0$ of the optical divider 21 is fusion-spliced to the light exit end of the amplification optical fiber 10 at point C. One of the optical I/O ports $P_1$ to $P_7$ of the optical divider 21 is fusion-spliced to the light entrance end of the transmission optical fiber 11 at point A, while another is optically connected to the pumping light source 33 through the optical fiber 34.

The foregoing structures allow the optical fiber laser 400 according to the fourth embodiment to perform bidirectional pumping. In the optical fiber laser 400 according to the fourth embodiment, the modulator 51 can perform any of the pulse modulation methods according to the first to fourth embodiments mentioned above.

As described above, the pulse modulation method according to the present invention regulates a modulation pattern of a driving electric signal for indicating direct modulation or external modulation of a seed light source at the time of generating a seed light pulse in an optical fiber laser. That is, constructing an electric signal pattern for generating one optical pulse by a plurality of pulse components and adjusting signal intervals, signal widths, intensities, and the like of the plurality of pulse components can expand the pulse width of thus generated optical pulse and effectively suppress nonlinear optical phenomena at the same time.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A pulse modulation method of directly-modulating a seed light source to output an optical pulse with a predetermined period as a repetition period, by a modulator,
    wherein a modulation pattern, as a pattern of a modulated voltage fed into the modulator, is constituted by electrical pulse components two or more of which are temporally separated from each other and correspond to one optical pulse within the predetermined period, while each of the two or more electrical pulse components has a pulse width smaller than the pulse width of the one optical pulse, and
    wherein optical components, each corresponding to one of the two or more electrical pulse components, temporally overlap each other to constitute the one optical pulse.

2. The pulse modulation method according to claim 1, wherein each pulse width of the two or more electrical pulse components is smaller than ½ of the pulse width of the one optical pulse within the predetermined period.

3. The pulse modulation method according to claim 1, wherein each pulse width of two or more electrical pulse components is longer than an interval between the electrical pulse components adjacent to each other out of the two or more electrical pulse components.

4. The pulse modulation method according to claim 1, wherein an interval between the electrical pulse components adjacent to each other, out of the two or more electrical pulse components, is not longer than a rise time or fall time of each of the two or more electrical pulse components.

5. The pulse modulation method according to claim 1, wherein the two or more electrical pulse components have pulse peak values different from each other.

6. The pulse modulation method according to claim 1, wherein a driving current of the seed light source is modulated, so as to adjust each peak value of the two or more electrical pulse components.

7. An optical fiber laser, comprising:
    a seed light source;
    a modulator for directly-modulating the seed light source to output an optical pulse with a predetermined period as a repetition period, the modulator being electrically connected to the seed light source; and
    an optical fiber amplifier for amplifying the light to be amplified modulated into the optical pulse and outputting the amplified light;
    wherein a modulation pattern as a pattern of a modulated voltage fed into the modulator is constituted by electrical pulse components two or more of which are temporally separated from each other and correspond to one optical pulse within the predetermined period, while each of the two or more electrical pulse components has a pulse width smaller than the pulse width of the one optical pulse, and
    wherein optical components, each corresponding to one of the two or more electrical pulse components, temporally overlap each other to constitute the one optical pulse.

* * * * *